United States Patent
DeLong et al.

(10) Patent No.: US 12,342,281 B2
(45) Date of Patent: Jun. 24, 2025

(54) LOW POWER KEY SYSTEMS AND METHODS

(71) Applicant: Ford Global Technologies, LLC, Dearborn, MI (US)

(72) Inventors: Aaron DeLong, Toledo, OH (US); Vivekanandh Elangovan, Canton, MI (US)

(*) Notice: Subject to any disclaimer, the term of this patent is extended or adjusted under 35 U.S.C. 154(b) by 505 days.

(21) Appl. No.: 17/929,139

(22) Filed: Sep. 1, 2022

(65) Prior Publication Data

US 2024/0080765 A1 Mar. 7, 2024

(51) Int. Cl.
*H04W 52/02* (2009.01)
*B60R 25/24* (2013.01)

(52) U.S. Cl.
CPC ....... *H04W 52/0229* (2013.01); *B60R 25/245* (2013.01); *B60R 2325/101* (2013.01)

(58) Field of Classification Search
None
See application file for complete search history.

(56) References Cited

U.S. PATENT DOCUMENTS

| | | |
|---|---|---|
| 10,730,479 B2 | 8/2020 | Golsch |
| 11,007,977 B2 | 5/2021 | Golsch et al. |
| 11,037,387 B1 | 6/2021 | Elangovan et al. |
| 2014/0285319 A1* | 9/2014 | Khan ........ G07C 9/00 340/5.61 |
| 2020/0198580 A1* | 6/2020 | Saleh ........ B60R 25/24 |
| 2020/0382153 A1* | 12/2020 | Nackaerts ........ H04W 88/06 |
| 2020/0384951 A1* | 12/2020 | Preradovic ........ H04W 4/40 |
| 2021/0379990 A1 | 12/2021 | Tucci et al. |
| 2022/0086188 A1* | 3/2022 | Ohashi ........ H04W 76/15 |

OTHER PUBLICATIONS

Aurelien Francillon et al., Relay Attacks on Passive Keyless Entry and Start Systems in Modern Cars, Jan. 2010.
Dr. Jedidi Kamouaa, Turn-Key Passive Entry / Passive Start Solution, Automotive Compilation, vol. 10, 2013, 29-35.

* cited by examiner

*Primary Examiner* — German Viana Di Prisco
(74) *Attorney, Agent, or Firm* — Frank Lollo; Eversheds Sutherland (US) LLP (57) ABSTRACT

A Passive Entry Passive Start (PEPS) method is described. The method includes obtaining, via a BLE receiver of a key fob, a first BLE wakeup signal from a vehicle. In response to obtaining the first wakeup signal, the method includes activating a BLE transceiver of the key fob. Upon activation of the BLE transceiver, the method includes activating a UWB transceiver of the key fob via the BLE transceiver. When the UWB transceiver is activated, the method includes receiving a challenge signal from the vehicle via the UWB transceiver. Upon receiving the challenge signal, the method includes transmitting a response to the challenge signal via the UWB transceiver. Based on the response to the challenge signal, the method includes receiving a success signal from the vehicle. Upon receiving the success signal, the method includes deactivating BLE transceiver and the UWB transceiver.

20 Claims, 7 Drawing Sheets

LOW POWER KEY SYSTEMS AND METHODS

FIELD

The present disclosure relates to a key systems for accessing vehicles, and more particularly, to a low power Passive Entry Passive Start (PEPS) key system.

BACKGROUND

Modern vehicles use PEPS key systems to facilitate hands-free access to the vehicles. An operator of a vehicle carries a PEPS key fob, in his hand, purse or pocket, to unlock or start the vehicle. As the key fob approaches the vehicle, the vehicle flashes the car lights and/or unlocks the vehicle doors based on a distance between the vehicle and the key fob.

A conventional PEPS key system uses radiofrequency (RF) signals to authenticate the key fob by exchanging unique key access codes between the vehicle and the key fob. Specifically, the key fob and the vehicle communicate with each other by using RF signals, so that the vehicle can determine the location of the key fob and authenticate the key fob. The vehicle performs the PEPS operation (for example, flashes the car lights and/or unlocks the vehicle doors) when the unique key codes match with a predefined value and the key fob is near the vehicle.

In the advanced PEPS key system with relay attack protection, the key fob typically consumes a large amount of power to establish and/or maintain the RF connection with the vehicle, and to gain access to the vehicle. This results in a significant drain on the battery of the key fob.

Thus, there exists a need for an improved PEPS key system that minimizes the consumption of power in the key fob.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a portable device, for example a key fob, configured to activate passive entry and/or passive start (PEPS) operation of a vehicle. In some aspects, the portable device may cause the vehicle to activate the welcome lights and/or unlock the vehicle doors, when the portable device is near the vehicle. The portable device may include one or more transceiver units that may be in shutdown state by default. The vehicle PEPS system may transmit a periodic wakeup signal. The portable device may receive the wakeup signal from the vehicle, causing the portable device to activate one or more portable device transceiver units. Upon activation, the portable device transceiver units may communicate authentication information with the corresponding vehicle transceiver units, causing the vehicle control system to enable PEPS operation. Responsive to determining that the PEPS operation is successfully completed, the portable device may shutdown the portable device transceiver units, thus reducing power consumption within the portable device.

In one or more aspects, the portable device may include a first transceiver unit configured to communicate with the vehicle according to a first communication protocol. The first communication protocol may be, for example, Bluetooth® Low Energy (BLE) communication protocol and the first transceiver unit may include a BLE wakeup receiver and a BLE transceiver. The BLE transceiver may be in shutdown state by default.

In some aspects, the portable device may include a second transceiver unit configured to communicate with the vehicle according to a second communication protocol. The second communication protocol may be, for example, Ultra-Wideband (UWB) communication protocol and the second transceiver unit may include, for example, a UWB transceiver. The UWB transceiver, too, may be in shutdown state by default.

In some aspects, the BLE wakeup receiver may receive a wakeup signal from the vehicle when the portable device is in a first predefined proximity range of the vehicle. Upon receipt of the wakeup signal, the BLE wakeup receiver may cause activation of the BLE transceiver, which may in turn activate the UWB transceiver.

Upon activation of the BLE and the UWB transceivers of the portable device, the vehicle may establish a connection with the portable device and authenticate the portable device. The vehicle may perform the PEPS operation, when the authentication is successful and when the portable device is in a second predefined proximity range of the vehicle. Upon successful completion of the PEPS operation, the vehicle may send a signal to the BLE transceiver, causing the BLE transceiver and the UWB transceiver to enter shutdown state. Thus, the portable device transceiver units activate when the portable device is in vicinity of the vehicle and remain in shutdown state when the portable device is far from the vehicle. This reduces the power consumption within the portable device.

In some aspects, the second communication protocol may be, for example, Low-Frequency (LF) communication protocol and the second transceiver unit may include, for example, an LF transceiver. The LF transceiver, too, may be in shutdown state when the portable device is far from the vehicle.

The present disclosure provides various advantages over existing systems. For example, in addition to reducing the power consumption of the portable device (as described above), the vehicle PEPS system is robust to relay attacks due to the use of distance bounding with BLE and UWB.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
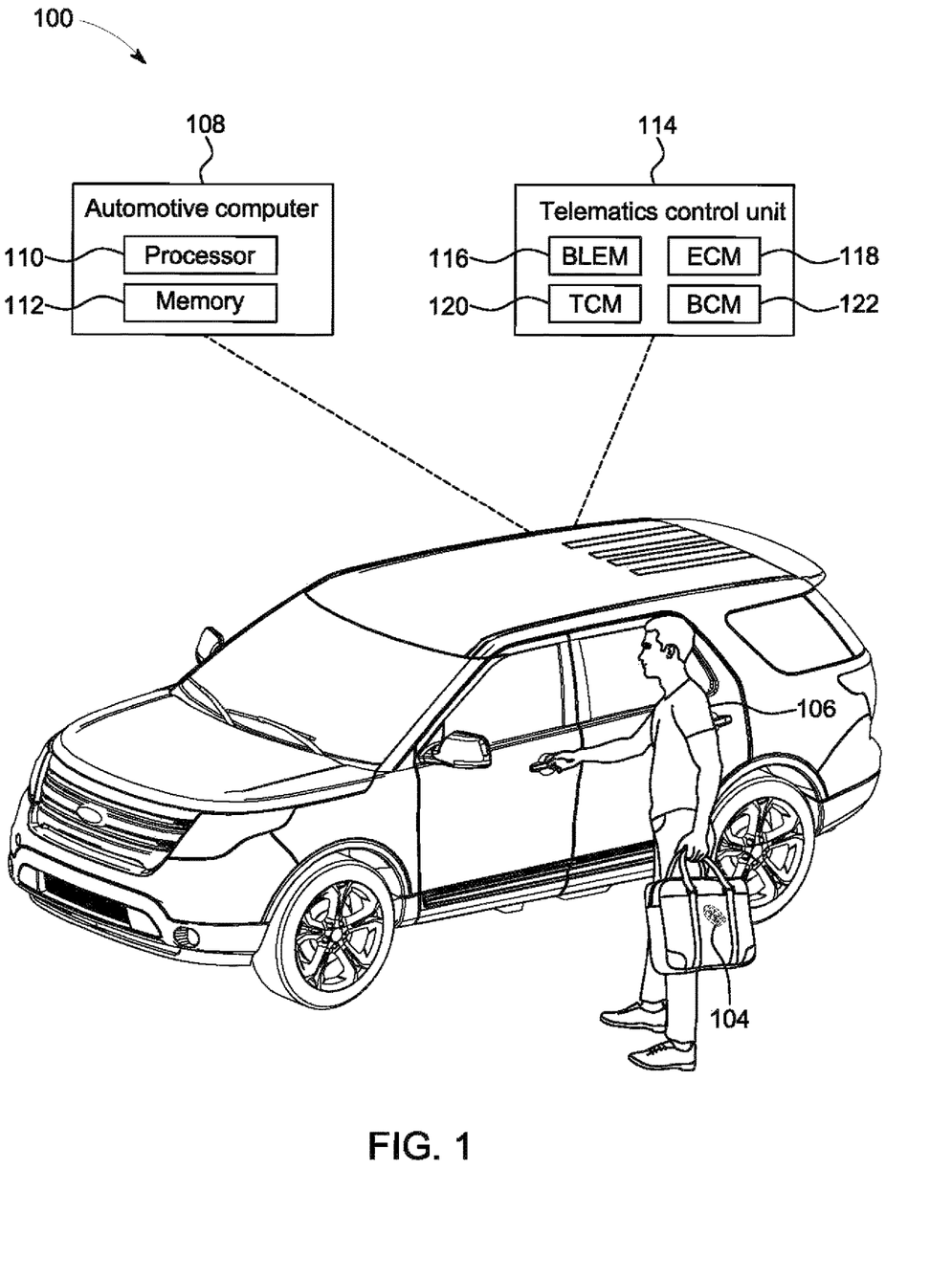
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 102 and a portable device 104. The portable device 104 may be with an operator 106 of the vehicle 102, for example in his hand, pocket, purse, and the like. The portable device 104 may communicatively couple with the vehicle 102 via one or more communication protocols. Examples of the communication protocols may include, but are not limited to, Bluetooth® Low Energy (BLE), Ultra-Wideband (UWB), Low Frequency (LF), and/or the like.

The vehicle 102 may include an automotive computer 108, which may include one or more vehicle processors 110 and a memory 112. The vehicle 102 may further include a vehicle Telematics Control Unit (TCU) 114, which may be disposed in communication with and/or be a part of the automotive computer 108. The vehicle TCU 114 may, in some example embodiments, communicate information to and receive communications from the portable device 104.

The vehicle 102 may take the form of any passenger or commercial vehicle such as, for example, a car, a work vehicle, a crossover vehicle, a van, a minivan, a taxi, a bus, etc. Further, the vehicle 102 may be a manually driven vehicle, and/or be configured to operate in a fully autonomous (e.g., driverless) mode and/or partially autonomous mode, and may include any powertrain such as, for example, a gasoline engine, one or more electrically actuated motor(s), a hybrid system, etc.

The portable device 104 may be, for example, a key fob. In some aspects, the portable device 104 may communicate with the vehicle 102 through one or more encrypted wireless channels and establish connection between the portable device 104 and the vehicle TCU 114. The portable device 104 may communicate with the vehicle TCU 114 by using wireless transceivers associated with the vehicle TCU 114 on the vehicle 102. An example of one such wireless transceiver may be a Bluetooth® Low Energy Module (BLEM) 116. The BLEM 116 may communicate with the portable device 104 by using BLE communication protocol. In other examples, the wireless transceivers may be a UWB transceiver, a Low-frequency (LF) transceiver, and/or like (not shown in FIG. 1).

The vehicle TCU 114 can provide communication and control access to a plurality of vehicle computing modules such as, for example, a Controller Area Network (CAN) bus (not shown in FIG. 1), the BLEM 116, one or more Engine Control Modules (ECMs) 118, a Transmission Control Module (TCM) 120, and/or a Body Control Module (BCM) 122. Control and/or communication with other control modules not shown are possible, and such control is contemplated. In some aspects, the vehicle TCU 114 may control aspects of the vehicle 102 through the control modules 116-122 and implement one or more instruction sets received from the portable device 104.

As mentioned above, the automotive computer 108 may include the one or more vehicle processors 110 and the computer-readable memory 112. The automotive computer 108 may be installed in an engine compartment of the vehicle 102 (or elsewhere in the vehicle 102) in accordance with the disclosure. In one or more aspects, the automotive computer 108 may be integrated with and/or be incorporated with the vehicle TCU 114. In other aspects, some or all components of the automotive computer 108 may be shared with the vehicle TCU 114.

For the sake of simplicity, the computing system architecture of the automotive computer 108 may omit certain computing modules. It should be readily understood that the environment 100 depicted in FIG. 1 is one example of a possible implementation according to the present disclosure, and thus, it should not be considered limiting or exclusive.

In some aspects, the one or more vehicle processors 110 may be disposed in communication with one or more memory devices (e.g., the memory 112 and/or one or more external databases (not shown in FIG. 1)). The one or more vehicle processors 110 may utilize the memory 112 to store programs in code and/or to store data for performing aspects of the present disclosure.

The memory 112 may be a non-transitory computer-readable memory. The one or more vehicle processors 110 may be configured to execute computer-executable instructions stored in the memory 112 for performing various functions for performing vehicle control capabilities in accordance with the disclosure. Consequently, the memory 112 may be used for storing code and/or data code and/or data for performing operations in accordance with the disclosure. The memory 112 can include any one or a combination of volatile memory elements (e.g., dynamic random-access memory (DRAM), synchronous dynamic random access memory (SDRAM), etc.) and can include any one or more non-volatile memory elements (e.g., erasable programmable read-only memory (EPROM), flash memory, electronically erasable programmable read-only memory (EEPROM), programmable read-only memory (PROM), etc.

The memory 112 may be one example of a non-transitory computer-readable medium and may be used to store programs in code and/or to store data for performing various operations in accordance with the disclosure. The instructions in the memory 112 can include one or more separate programs, each of which can include an ordered listing of computer-executable instructions for implementing logical functions.

The memory 112 may store various code modules such as, for example, a secure communication controller (not shown in FIG. 1) for establishing communication connection between the portable device 104, the vehicle TCU 114, and/or the automotive computer 108. The secure communication controller may also be configured to encrypt messages and determine authenticity of key-on requests (e.g., a door handle pull, unlock instruction, etc.).

Figure 2:
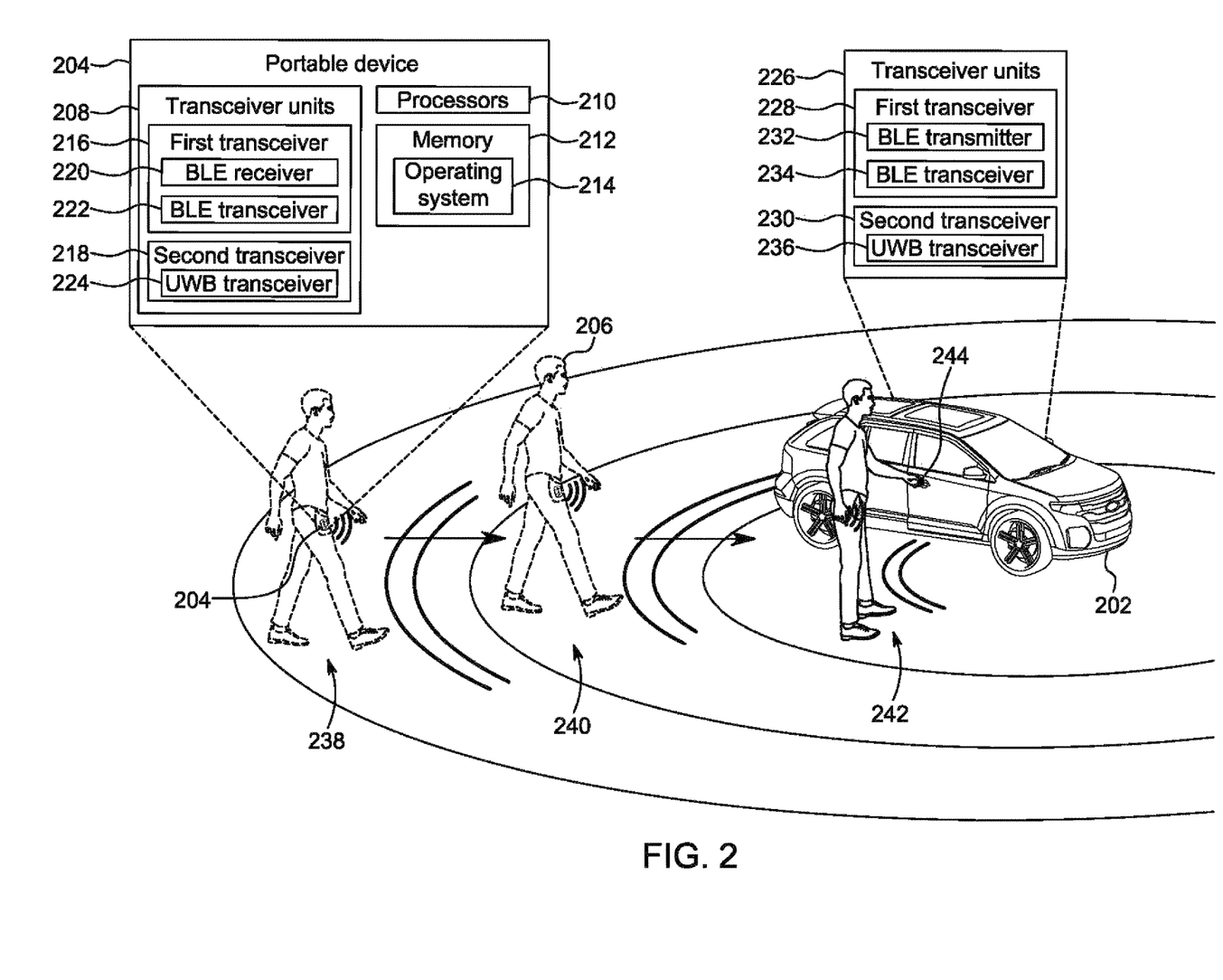
FIG. 2 illustrates an example embodiment of a PEPS key system in accordance with the present disclosure.

FIG. 2 illustrates an example embodiment of a PEPS key system 200 in accordance with the present disclosure. The PEPS key system 200 described herein can be implemented in hardware, software (e.g., firmware), or a combination thereof. Specifically, FIG. 2 illustrates a vehicle 202 (same as the vehicle 102) that may be locked and parked. In one aspect, the vehicle 202 may unlock when a portable device 204 (same as the portable device 104) associated with the vehicle 202 enters a predetermined zone near the vehicle 202, and when the vehicle 202 authenticates the portable device 204.

As discussed above, the portable device 204 may be, for example, a key fob. An operator 206 may carry the portable device 204 in his hand or pocket (or any other location such as purse, briefcase, etc.) to enable hands-free interaction with the vehicle 202.

In some aspects, the portable device 204 may include a plurality of transceiver units 208, one or more processors 210, and a memory 212, which may communicatively couple with each other.

The one or more processors 210 are collectively a hardware device for executing program instructions (aka software), stored in a computer-readable memory (e.g., the memory 212). The one or more processors 210 can be a custom made or commercially available processor, a central processing unit (CPU), a plurality of CPUs, an auxiliary processor among several other processors associated with the portable device 204, a semiconductor-based microprocessor (in the form of a microchip or chip set), or generally any device for executing instructions.

The memory 212 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The instructions in the memory 212 can include one or more separate programs, each of which can include an ordered listing of computer-executable instructions for implementing logical functions. In the example of FIG. 2, the instructions in the memory 212 can include an operating system 214. The operating system 214 can control the execution of computer programs to provide input-output control, file and data management, memory management, and communication control and related services.

The memory 212 may also include program instructions for the plurality of transceiver units 208. In some aspects, the instructions may cause the plurality of transceiver units 208 to perform operations as discussed below.

In accordance with one or more aspects, the plurality of transceivers unit 208 may include one or more first transceiver units 216 (a first transceiver unit 216) and one or more second transceiver units 218 (a second transceiver unit 218). The first transceiver unit 216 may be configured to transmit or receive signals according to a first communication protocol, and the second transceiver unit 218 may be configured to transmit or receive signals according to a second communication protocol. In one aspect, the first communication protocol may be a Bluetooth® Low Energy (BLE) communication protocol, and the second communication protocol may be an ultra-wideband (UWB) communication protocol. The BLE communication protocol may be used for remote keyless entry (RKE) and for activation of the UWB communication protocol. The UWB communication protocol may be used for localization and relay attack prevention of the PEPS key system 200.

In another aspect, the first communication protocol may be a BLE communication protocol, and the second communication protocol may be a low-frequency (LF) communication protocol. The BLE communication protocol may be used for RKE, and relay attack prevention (via time of flight) of the PEPS key system 200. The LF communication protocol may be used for localization.

In some aspects, the first transceiver unit 216 may include a BLE receiver 220 and a BLE transceiver 222. The BLE receiver 220 may be configured to receive a first BLE wakeup signal from the vehicle 202, and the BLE transceiver 222 may be configured to receive and transmit BLE signals from/to the vehicle 202. The second transceiver unit 218 may include a key fob UWB transceiver 224. The key fob UWB transceiver 224 may be configured to receive and transmit UWB signals from/to the vehicle 202. Typically, the BLE transceiver 222 and the key fob UWB transceiver 224 are in shutoff or deactivated state by default, to conserve power consumption in the portable device 204. In some aspects, the second transceiver unit 218 may include a LF receiver (not shown in FIG. 2) that may be configured to receive a second LF wakeup signal from the vehicle 202.

In some aspects, the vehicle 202 may include a plurality of transceiver units 226 (for example, in the vehicle TCU 114, as described in FIG. 1), in addition to the units depicted in FIG. 1 for the vehicle 102. The plurality of transceiver units 226 may include one or more first transceiver units 228 (a first transceiver unit 228) and one or more second transceiver units 230 (a second transceiver unit 230). The first transceiver unit 228 may be configured to transmit or receive signals according to the first communication protocol, and the second transceiver unit 230 may be configured to transmit or receive signals according to the second communication protocol.

In some aspects, the first transceiver unit 228 may include a low-power vehicle BLE transmitter 232 and a vehicle BLE transceiver 234. The low-power vehicle BLE transmitter 232 may be configured to continuously or periodically broadcast low-power BLE signals (e.g., the first BLE wakeup signal that is received by the BLE receiver 220) to search for the portable device 204. In some aspects, the low-power vehicle BLE transmitter 232 may transmit the low-power BLE signal when the operator 206 grabs/touches the handle of the vehicle 202. The vehicle BLE transceiver 234 may be configured to receive and transmit BLE signals from/to the portable device 204.

In one aspect, the second transceiver unit 230 may include a vehicle UWB transceiver 236. The vehicle UWB transceiver 236 may be configured to receive and transmit UWB signals from/to the portable device 204. Typically, the vehicle BLE transceiver 234 and the vehicle UWB transceiver 236 are in shutoff or deactivated state by default, to conserve power consumption in the vehicle 202.

In another aspect, the second transceiver unit 230 may include an LF transmitter (not shown in FIG. 2) that may be configured to transmit the second LF wakeup signal to the second transceiver unit 218 of the portable device 204.

Figure 3:
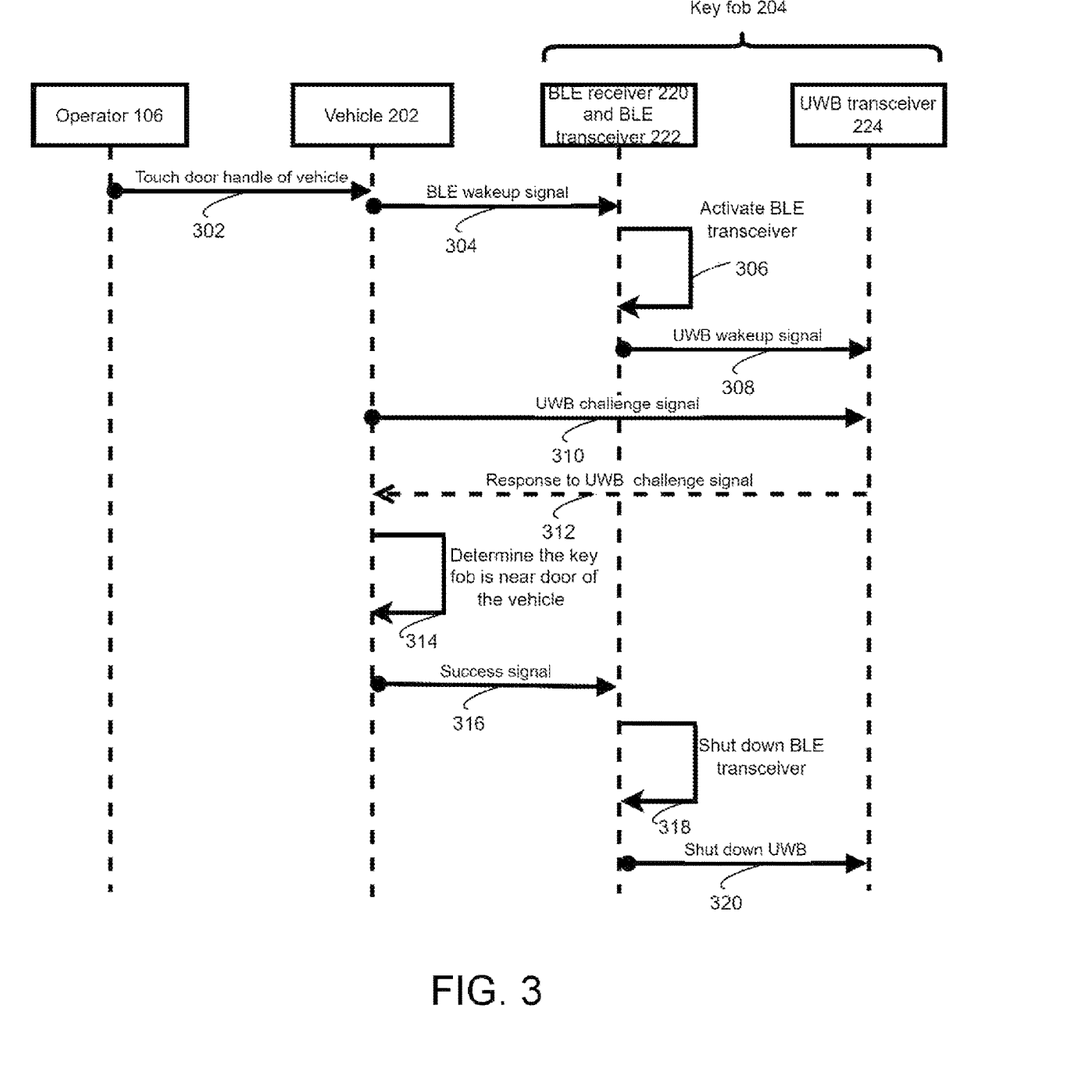
FIG. 3 depicts a first signal timing diagram of the PEPS key system in accordance with the present disclosure.
Figure 4:
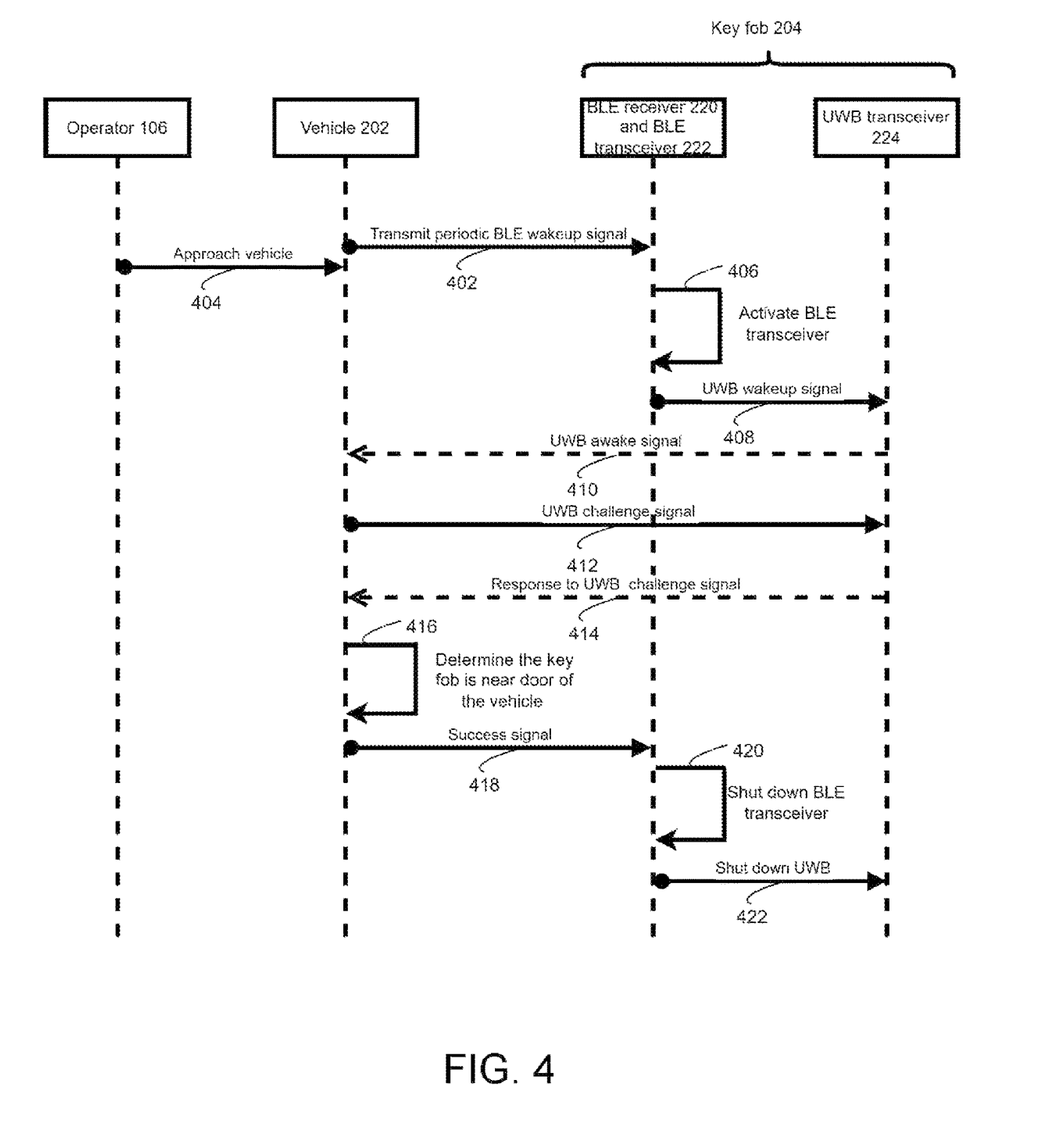
FIG. 4 depicts a second signal timing diagram of the PEPS key system in accordance with the present disclosure.
Figure 5:
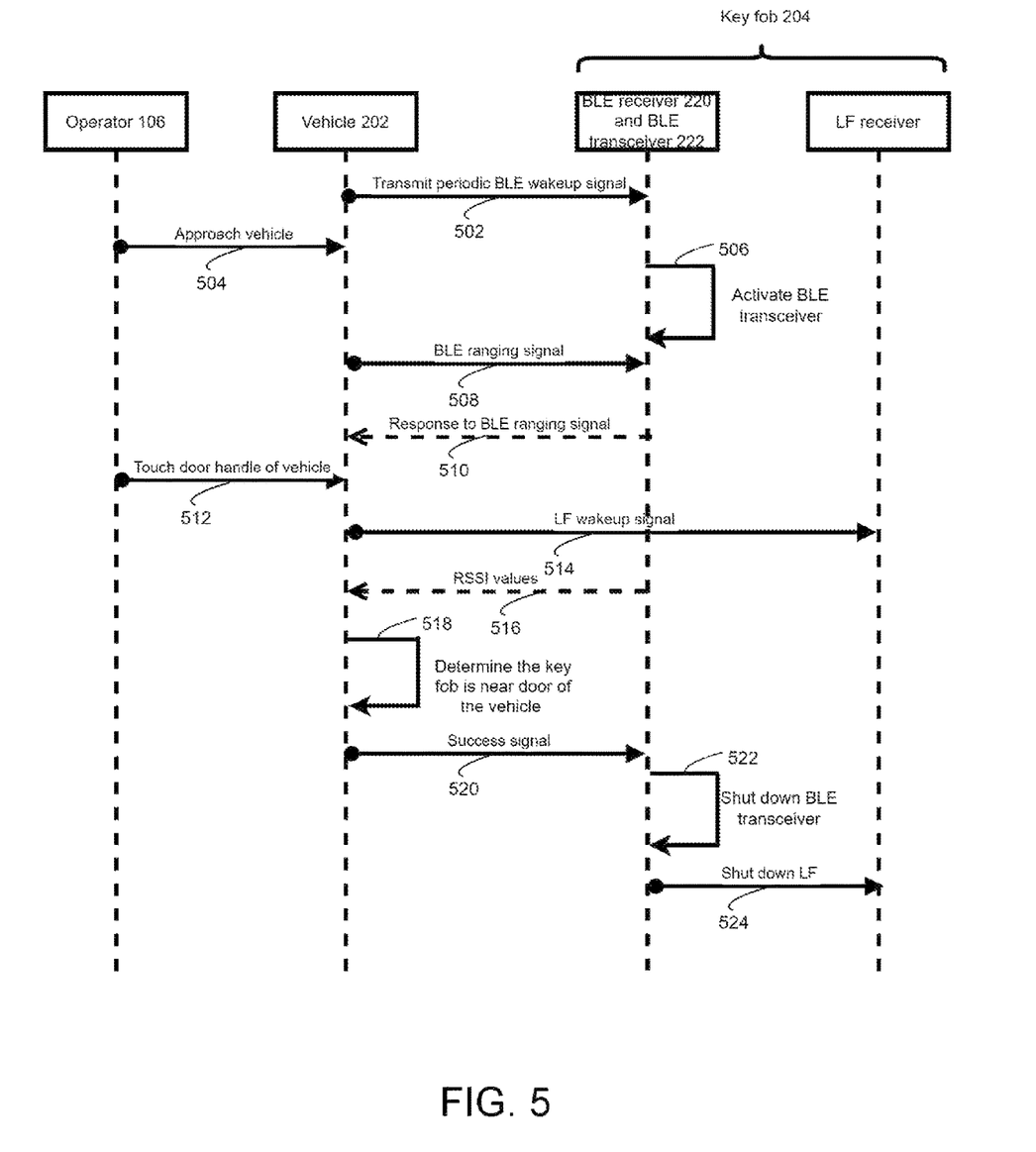
FIG. 5 depicts a third signal timing diagram of the PEPS key system in accordance with the present disclosure.

The operation of the units of the PEPS key system 200 may be understood in conjunction with FIGS. 3-5. While describing FIGS. 3-5, reference would be taken from FIG. 2.

FIG. 3 depicts a first signal timing diagram of the PEPS key system 200, in accordance with the present disclosure. Specifically, FIG. 3 depicts a series of events and the corresponding series of signal transfers between the vehicle 202 and the portable device 204, when the operator 206 uses a touch sensor on a door handle 244 of the vehicle 202 to perform the PEPS operation.

As shown in the first signal timing diagram, when the operator 206 touches or grabs the door handle 244 of the vehicle 202 at step 302, the vehicle 202 may detect the touch by using the touch sensor (not shown in FIG. 2 or FIG. 3) positioned in the door handle 244. In some aspects, the touch sensor may communicatively couple with the vehicle transceiver units 226. Based on the detection of the touch, the touch sensor may send a touch signal (not shown in FIG. 3) to the vehicle transceiver units 226. On receipt of the touch signal, the vehicle 202 may activate the vehicle BLE transceiver 234 and the second transceiver unit 230. At step 304, the vehicle 202 may transmit the first BLE wakeup signal to the portable device 204 (hereinafter referred to as the key fob 204). In some aspects, the vehicle 202 may transmit the first BLE wakeup signal via the first transceiver unit 228 (for example, via the low-power vehicle BLE transmitter 232 or the vehicle BLE transceiver 234).

The key fob BLE receiver 220 may receive the first BLE wakeup signal from the vehicle 202, when the key fob 204 is in a predetermined range of the vehicle 202. In response to the receipt of the first BLE wakeup signal, the one or more key fob processors 210 disposed on the key fob 204 may execute the instructions (stored in the memory 212) to cause the key fob 204 to obtain the first BLE wakeup signal from the key fob BLE receiver 220. On receipt of the first BLE wakeup signal, the one or more key fob processors 210 may activate the key fob BLE transceiver 222, at step 306.

Responsive to activation of the key fob BLE transceiver 222, the one or more key fob processors 210 may transmit a UWB wakeup signal to the key fob UWB transceiver 224 (or the second transceiver unit 218) via the key fob BLE transceiver 222. The one or more key fob processors 210 may transmit the UWB wakeup signal to activate the key fob UWB transceiver 224, at step 308.

In accordance with one or more aspects, at step 310, the vehicle 202 may also issue/transmit a UWB challenge signal (via the vehicle UWB transceiver 236 or the second vehicle transceiver unit 230) to the key fob UWB transceiver 224, when the operator 206 touches or grabs the door handle 244 of the vehicle 202. In one aspect, the vehicle 202 may transmit the UWB challenge signal along with the first BLE wakeup signal or may transmit the UWB challenge signal after transmitting the first BLE wakeup signal to the key fob 204. On receipt of the UWB challenge signal, the key fob UWB transceiver 224 may transmit a response to the UWB challenge signal to the vehicle UWB transceiver 236 of the vehicle 202, at step 312.

In some aspects, the UWB challenge signal may be associated with a passive entry or a passive start operation of the vehicle 202. In particular, the vehicle 202 may use the UWB challenge signal to authenticate the key fob 204, establish a connection between the vehicle 202 and the key fob 204, and to determine a distance between the vehicle 202 and the key fob 204, and grant the access of the vehicle 202. In some aspects, there may be subsequent exchange of the UWB challenge signals. The vehicle 202 may utilize the UWB challenge signals to determine an updated distance between the vehicle 202 and the key fob 204, at step 314.

In particular, when the vehicle 202 receives the response to the UWB challenge signal, the one or more vehicle processors 110 (not shown in FIG. 2) may verify and determine the authenticity of the key fob 204. In addition, the one or more vehicle processors 110 may determine whether the key fob 204 is in a first predetermined range 242 of the vehicle 202 (e.g., near the door of the vehicle 202). In some aspects, the one or more vehicle processors 110 may authenticate the key fob 204 by exchanging unique codes/unique keys in the challenge signals. In other aspects, the one or more vehicle processors 110 may determine whether the key fob 204 is in the first predefined range (e.g., measure the distance between the vehicle 202 and the key fob 204) by using distance-based measurement via time-of-flight (ToF).

Upon successful determination that the key fob 204 is in the first predetermined range 242, the vehicle 202 may transmit, via the vehicle BLE transceiver 234, a success signal to the key fob BLE transceiver 222 at step 316. In addition, the vehicle 202 may unlock the door of the vehicle 202 (or provide any other access to the operator 206 such as opening of the trunk of the vehicle 202).

Upon receipt of the success signal via the key fob BLE transceiver 222, the key fob 204 may deactivate the key fob BLE transceiver 222 (at step 318) and the key fob UWB transceiver 224 (at step 320). In particular, upon the receipt of the success signal, the one or more vehicle processors 210 may deactivate the key fob BLE transceiver 222, and the key fob UWB transceiver 224. In one aspect, the key fob BLE transceiver 222 may send a deactivation signal to the key fob UWB transceiver 224 (at step 320), to deactivate the key fob UWB transceiver 224.

A person ordinarily skilled in the art may appreciate from the description above that the high-power consuming units (e.g., the key fob BLE transceiver 222 and the key fob UWB transceiver 224) of the key fob 204 are in active state when the vehicle 202/key fob 204 perform a PEPS operation. When no PEPS operation is performed, the high-power consuming units remain in shutdown state, thus minimizing power consumption in the key fob 204.

FIG. 4 depicts a second signal timing diagram of the PEPS key system 200, in accordance with the present disclosure. Specifically, FIG. 4 depicts a series of events and the corresponding series of signal transfers between the vehicle 202 and the key fob 204, when the vehicle 202 performs the PEPS operation using approach detection of the key fob 204.

As shown in the second signal timing diagram, at step 402, the low-power vehicle BLE transmitter 232 may continuously or periodically broadcast low-power BLE signals (for example, the first BLE wakeup signal) to "search" for the key fob 204. When the operator 206 having the key fob 204 approaches the vehicle 202 and is in a second predetermined range 238 (which may be outside the coverage of the first vehicle transceiver unit 228), the key fob BLE transceiver 222 may remain in shut off mode. At step 404, when the operator 206 approaches a third predetermined range 240 (e.g., enters the range/coverage of the first vehicle transceiver unit 228), the key fob BLE receiver 220 may receive the first BLE wakeup signal broadcasted by the vehicle 202.

In response to the receipt of the first BLE wakeup signal, the one or more key fob processors 210 may execute the instructions (stored in the memory 212) to cause the key fob 204 to obtain the first BLE wakeup signal from the key fob BLE receiver 220. On receipt of the first BLE wakeup signal, the one or more key fob processors 210 may activate the key fob BLE transceiver 222, at step 406. In other words, the key fob BLE transceiver 222 may remain in shut off (or standby) mode until the key fob BLE receiver 220 receives the first BLE wakeup signal.

Upon activation of the key fob BLE transceiver 222, the one or more key fob processors 210 may activate the key fob UWB transceiver 224 (or the second transceiver unit 218), by transmitting (at step 408) a first UWB wakeup signal via the key fob BLE transceiver 222. Upon activation of the key fob UWB transceiver 224, the key fob UWB transceiver 224 may transmit (at step 410) a second UWB awake signal to the vehicle 202 (specifically to the vehicle UWB transceiver 236 or the second vehicle transceiver unit 230). In other words, the key fob UWB transceiver 224 activates the vehicle UWB transceiver 236.

Upon activation of the vehicle UWB transceiver 236, the vehicle 202 may issue/transmit the UWB challenge signal (via the vehicle UWB transceiver 236) to the key fob UWB transceiver 224, at step 412. Upon receipt of the UWB challenge signal, the key fob UWB transceiver 224 may transmit the response to the UWB challenge signal to the vehicle 202, at step 414. In some aspects, the vehicle UWB transceiver 236 may receive the response to the UWB challenge signal from the key fob UWB transceiver 224.

In one or more aspects, upon receipt of the response to the UWB challenge, the one or more vehicle processors 110 may verify and determine the authenticity of the key fob 204. In addition, the one or more vehicle processors 110 may determine the distance between the key fob 204 and the vehicle 202 by using distance-based measurement via time-of-flight (ToF), at step 416. In one aspect, the one or more vehicle processors 110 may activate welcome lights of the vehicle 202 when the key fob 204 is in the third predetermined range 240 and the key fob 204 is authentic.

When the operator 206 approaches closer to the vehicle 202 (for example, in the first predetermined range 242 or near to the door of the vehicle 202), the vehicle 202 may transmit, via the vehicle BLE transceiver 234, the success signal to the key fob BLE transceiver 222, at step 418. In addition, the vehicle 202 may unlock, via the one or more vehicle processors 110, the doors of the vehicle 202.

Upon the receipt of the success signal, the key fob 204 may deactivate the key fob BLE transceiver 222 (at step 420) and the key fob UWB transceiver 224 (at step 422), as discussed above.

In some aspects, the vehicle 202 may transmit, via the vehicle BLE transceiver 234, the success signal to the key fob BLE transceiver 222, when the key fob 204 is in the third predetermined range 240 and the key fob 204 does not enter the first predetermined range 242 for a preset time. For example, in a scenario when the operator 206 enters the third predetermined range 240, but does not enter the first predetermined range 242 (or come close to the door handle 244 of the vehicle 202) for, as an example, 15 seconds, the vehicle 202 may send the success signal to the key fob 204. In this case, the PEPS operation ends at the activation of the welcome lights (as described above) and the vehicle 202 does not unlock the doors of the vehicle 202.

FIG. 5 depicts a third signal timing diagram of the PEPS key system 200, in accordance with the present disclosure. Specifically, FIG. 5 depicts a series of events and the corresponding series of signal transfers between the vehicle 202 and the key fob 204, when the key fob 204 includes an LF receiver, in addition to the key fob BLE receiver 220 and the key fob BLE transceiver 222, and the vehicle 202 includes an LF transceiver. In other words, the embodiment shown in FIG. 5 corresponds to a scenario when the second key fob transceiver unit 218 is an LF receiver and the second vehicle transceiver unit 230 is an LF transceiver. In some aspects, the key fob LF receiver may receive LF wakeup signals from the vehicle LF transceiver, for localization purposes.

According to the third signal timing diagram, at step 502, the low-power vehicle BLE transmitter 232 may continuously or periodically broadcast the low-power BLE signals (for example, the first BLE wakeup signal) to search for the key fob 204. As discussed above, the key fob BLE receiver 220 may receive the first BLE wakeup signal when the operator 206 approaches the third predetermined range 240, at step 504. In response to the receipt of the first BLE wakeup signal, the one or more key fob processors 210 may obtain the first BLE wakeup signal from the key fob BLE receiver 220. On receipt of the first BLE wakeup signal, the one or more key fob processors 210 may activate the key fob BLE transceiver 222, at step 506.

Upon the activation of the key fob BLE transceiver 222, the vehicle 202 may initiate a BLE ranging session with the key fob 204, to prevent relay attacks in the PEPS key system 200. In one aspect, the initiation of the BLE ranging session may involve exchange of private keys of the vehicle 202 and the key fob 204 and may be used to authenticate the key fob 204. Specifically, to initiate the BLE ranging session, the vehicle BLE transceiver 234 may transmit a BLE ranging signal to the key fob BLE transceiver 222, at step 508. On receipt of the BLE ranging signal, the key fob BLE transceiver 222 may transmit a response to the BLE ranging signal to the vehicle BLE transceiver 234, at step 510.

In one aspect, for the scenario described above, before the vehicle BLE transceiver 234 transmits the BLE ranging signal to the key fob BLE transceiver 222, the key fob BLE transceiver 222 may send a vehicle BLE awake signal to the vehicle 202 and activate the vehicle BLE transceiver 234. The vehicle BLE transceiver 234 may transmit the BLE ranging signal to the key fob BLE transceiver 222, responsive to the vehicle 202 activating the vehicle BLE transceiver 234 on receipt of the vehicle BLE awake signal.

In some aspects, the one or more vehicle processors 110 may cause vehicle 202 welcome light activation responsive to the activation of the BLE ranging session.

In some aspects, responsive to determining that the operator 206 has approached the vehicle 202 or is currently close to the vehicle 202 (e.g., within a 1-2 m range, for example), and the operator 206 touches or grabs the vehicle door handle 244, the touch sensor installed in the vehicle 202 may detect the touch of the operator 206 (at step 512). Upon detection of the touch, the vehicle 202 may transmit an LF wakeup signal (via the vehicle LF transceiver) to the key fob LF receiver, at step 514. Upon receipt of the LF wakeup signal, the one or more key fob processors 210 may activate key fob LF components (not shown in FIG. 2). The key fob LF components may measure the Received Signal Strength Indicator (RSSI) values of the signal received by the LF receiver and may send the measured RSSI values to the key fob BLE transceiver 222, at step 516. In some aspects, the measurement of the RSSI values may indicate the distance between the vehicle 202 and the key fob 204.

On receipt of the RSSI values, the key fob BLE transceiver 222 may transmit the RSSI values to the vehicle BLE transceiver 234 (e.g., via BLE payload). On receipt of the RSSI values, the vehicle 202 may determine, via the one or more vehicle processors 110, whether the key fob 204 is in the first predetermined range 242, at step 518.

Upon determination that the key fob 204 is in the first predetermined range 242, and the key fob 204 is authentic (for example, via the BLE ranging session), the vehicle 202 may unlock the door of the vehicle 202 and/or provides other access to the operator 206.

In some aspects, upon unlocking of the vehicle door the vehicle 202 may transmit, via the vehicle BLE transceiver 234, the success signal to the key fob BLE transceiver 222, at step 520. Upon receipt of the success signal via the key fob BLE transceiver 222, the key fob 204 may deactivate the key fob BLE transceiver 222 (at step 522) and the LF receiver (at step 524), as described above.

Figure 6:
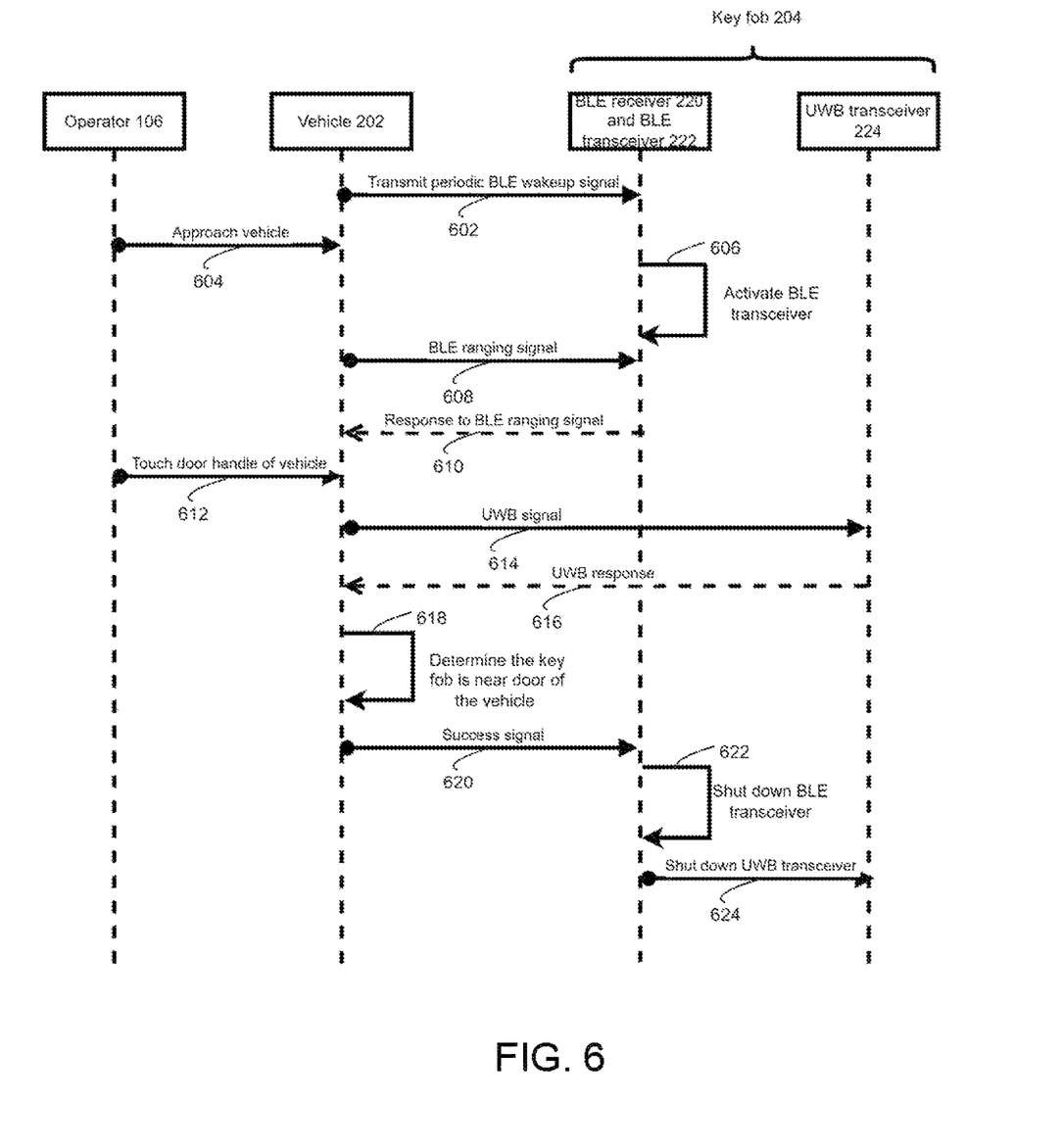
FIG. 6 depicts a fourth signal timing diagram of the PEPS key system in accordance with the present disclosure.

FIG. 6 depicts a fourth signal timing diagram of the PEPS key system 200, in accordance with the present disclosure. Specifically, FIG. 6 depicts a series of events and the corresponding series of signal transfers between the vehicle 202 and the key fob 204, when the vehicle 202 performs the PEPS operation using approach detection of the key fob 204 and when the operator 206 uses a touch sensor on the vehicle door handle 244 to perform the PEPS operation. In particular, FIG. 6 corresponds to a scenario when the second key fob transceiver unit 218 is the UWB transceiver 224 and the second vehicle transceiver unit 230 is the UWB transceiver 236.

According to the fourth signal timing diagram, at step 602, the low-power vehicle BLE transmitter 232 may continuously or periodically broadcast the low-power BLE signals (for example, the first BLE wakeup signal) to search for the key fob 204. As discussed above, the key fob BLE receiver 220 may receive the first BLE wakeup signal when the operator 206 approaches the third predetermined range 240, at step 604. At step 606, the key fob 204 may activate the key fob BLE transceiver 222, as described above. Upon the activation of the key fob BLE transceiver 222, the vehicle 202 may initiate a BLE ranging session with the key fob 204, to prevent relay attacks in the PEPS key system 200. To initiate the BLE ranging session, the vehicle BLE transceiver 234 may transmit a BLE ranging signal to the key fob BLE transceiver 222, at step 608. On receipt of the BLE ranging signal, the key fob BLE transceiver 222 may transmit a response to the BLE ranging signal to the vehicle BLE transceiver 234, at step 610, as described in conjunction with FIG. 5.

In some aspects, responsive to determining that the operator 206 has approached the vehicle 202 or is currently close to the vehicle 202, and the operator 206 touches or grabs the vehicle door handle 244, the touch sensor installed in the vehicle 202 may detect the touch of the operator 206 (at step 612). Upon detection of the touch, the vehicle 202 may transmit a UWB signal to the key fob UWB transceiver 224, at step 614. In some aspects, the UWB signal may include a UWB wakeup signal and a UWB challenge signal, as described in conjunction with FIGS. 3-4. In response to receiving the UWB signal, the key fob UWB transceiver 224 may transmit a UWB response to the vehicle 202, at step 616. In some aspects, the UWB response may include a response to UWB challenge signal, as described in conjunction with FIGS. 3-4.

In one or more aspects, upon receipt of the UWB response, the one or more vehicle processors 110 may determine whether the key fob 204 is in the first predetermined range 242, at step 618. Upon determination that the key fob 204 is in the first predetermined range 242, and the key fob 204 is authentic (for example, via the BLE ranging session), the vehicle 202 may unlock the door of the vehicle 202 and/or provides other access to the operator 206.

In some aspects, upon unlocking of the vehicle door, the vehicle 202 may transmit, via the vehicle BLE transceiver 234, a success signal to the key fob BLE transceiver 222, at step 620. Upon receipt of the success signal via the key fob BLE transceiver 222, the key fob 204 may deactivate the key fob BLE transceiver 222 (at step 622) and the UWB transceiver 224 (at step 624), as described above.

While the aspects mentioned above in conjunction with FIGS. 3-6 describe scenarios in which the operator 206 (having the key fob 204) approaches the vehicle 202 and/or touches the vehicle door handle 244, the present disclosure may apply to additional aspects as well, when the operator 206 (and hence the key fob 204) is stationary. Specifically, in one aspect, the key fob 204 may deactivate or shut down the high-power consuming units (e.g., the key fob BLE transceiver 222 and the second transceiver unit 218) when the key fob 204 is not in motion and is in a range outside of the third predetermined range 240.

In another aspect, when the key fob 204 is not in motion but inside the third predetermined range 240, the key fob 204 may determine whether the key fob 204 is inside the cabin of the vehicle 202. In some aspects, the key fob 204 may determine whether the key fob 204 is inside the cabin by, for example, using the BLE signals transmitted by the vehicle BLE transceiver 234.

Responsive to determining, by the key fob 204, that the key fob 204 is not inside the cabin of the vehicle 202, the key fob 204 may deactivate the high-power consuming units of the key fob 204. On the other hand, responsive to determining that the key fob 204 is inside the cabin, the key fob maintains the activation of the high-power consuming key fob units. This allows the hands-free start of the vehicle 202 when the key fob 204 is inside the cabin and stationary. In a scenario where there are multiple key fobs in the vehicle cabin that are stationary, the vehicle 202 may command all but one key fob (for example, the key fob 204) to shut down their high-power consuming units.

Figure 7:
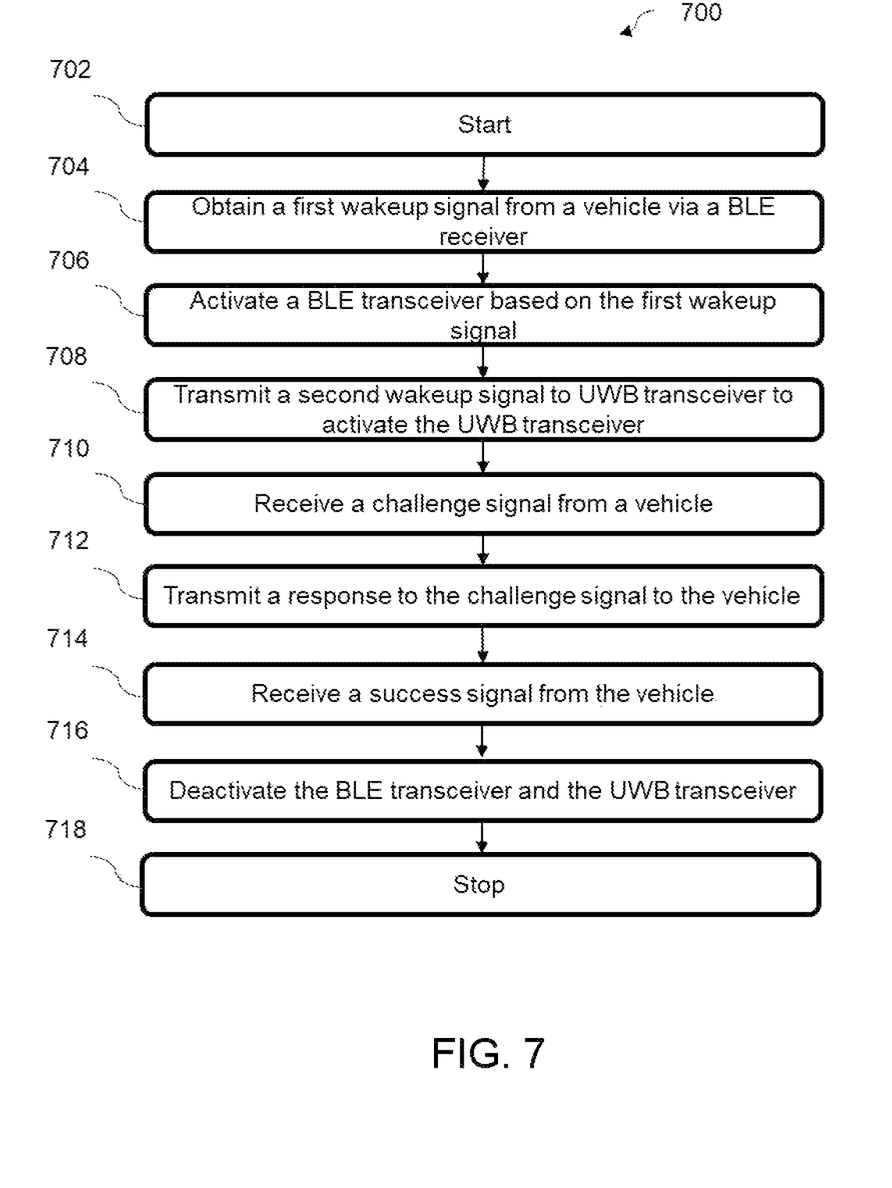
FIG. 7 depicts a flow diagram of an example method for accessing the vehicle, in accordance with the present disclosure.

FIG. 7 depicts a flow diagram of an example method 700 for accessing the vehicle, in accordance with the present disclosure. FIG. 7 may be described with continued reference to prior figures, including FIGS. 1-6. The following process is exemplary and not confined to the steps described hereafter. Moreover, alternative embodiments may include more or less steps that are shown or described herein and may include these steps in a different order than the order described in the following example embodiments.

Referring to FIG. 7, at step 702, the method 700 may commence. At step 704, the method 700 may include obtaining a first wakeup signal from the vehicle 202. In particular, the one or more key fob processors 210 may obtain the first wake up signal from the key fob BLE receiver 220 (part of the first transceiver unit 216). As discussed above, the key fob BLE receiver 220 may receive the first wake up signal from the first vehicle transceiver unit 228.

At step 706, the method 700 may include activating, via the one or more key fob processors 210, the key fob BLE transceiver 222 (part of the first transceiver unit 216) in response to obtaining the first wakeup signal. In response to the activation of the key fob BLE transceiver 222, the method 700 may include (at step 708) transmitting a second wakeup signal to the second transceiver unit 218 via the key fob BLE transceiver 222. In some aspects, the second transceiver unit 218 may include the key fob UWB transceiver 224.

At step 710, the method 700 may include receiving a challenge signal from the vehicle 202, via the second key fob transceiver unit 218. In particular, the key fob UWB transceiver 224 may receive the challenge signal from the second vehicle transceiver unit 230. At step 712, the method 700 may include transmitting a response to the challenge signal to the second vehicle transceiver unit 230, via the second key fob transceiver unit 218. As discussed above, the challenge signal may be associated with a passive entry or a passive start operation of the vehicle 202. Specifically, the vehicle 202 may use the challenge signal (and the response to the challenge signal) to authenticate the key fob 204 and determine a distance between the key fob 204 and the vehicle 202.

At step 714, the method 700 may include receiving a success signal from the vehicle 202 based on the response to the challenge signal. In particular, the first key fob transceiver unit 216 may receive the success signal when the one or more vehicle processors 110 determine that the key fob 204 is authentic and the key fob 204 is in a predefined proximity of the vehicle 202.

In response to the receipt of the success signal, the method 700 moves to step 716. At this step, the method 700 may include deactivating the key fob BLE transceiver 222 and the key fob UWB transceiver 224 (the second transceiver unit 218). In particular, upon the receipt of the success signal, the one or more key fob processors 210 may deactivate the key fob BLE transceiver 222, and the key fob UWB transceiver 224. In one aspect, the key fob BLE transceiver 222 may send a deactivation signal to the key fob UWB transceiver 224, to deactivate the key fob UWB transceiver 224. The method 700 stops at step 718.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A Passive Entry Passive Start (PEPS) method comprising:
    obtaining, via a first receiver of one or more second transceiver units of a portable device, a first wakeup signal from a vehicle, wherein the one or more second transceiver units are configured to transmit or receive signals according to a first communication protocol;
    activating a third transceiver of the one or more second transceiver units, in response to obtaining the first wakeup signal;
    in response to the activation of the third transceiver, transmitting, via the third transceiver, a second wakeup signal to one or more fourth transceiver units of the portable device, to activate the one or more fourth transceiver units, wherein the one or more fourth transceiver units are configured to transmit or receive signals according to a second communication protocol;
    upon activation of the one or more fourth transceiver units, receiving, via the one or more fourth transceiver units, a challenge signal from the vehicle, wherein the challenge signal is associated with a passive entry or a passive start operation of the vehicle;
    based on a receipt of the challenge signal, transmitting, via the one or more fourth transceiver units, a response to the challenge signal to the vehicle;
    receiving, via the third transceiver, a success signal from the vehicle based on the response to the challenge signal, wherein the success signal indicates that the portable device is in a predefined proximity of the vehicle; and
    deactivating the third transceiver and the one or more fourth transceiver units, on receipt of the success signal.

2. The PEPS method of claim 1, wherein the first receiver comprises a Bluetooth low energy (BLE) receiver, and the third transceiver comprises a BLE transceiver.

3. The PEPS method of claim 1, wherein the one or more fourth transceiver units comprise an ultra-wideband (UWB) transceiver.

4. The PEPS method of claim 1, wherein the first wakeup signal comprises a BLE wakeup signal from the vehicle, and wherein the second wakeup signal comprises a UWB wakeup signal.

5. A portable device comprising:
one or more first transceiver units configured to transmit or receive signals according to a first communication protocol, wherein the one or more first transceiver units comprise a second receiver and a third transceiver, and wherein the second receiver is configured to receive a first wakeup signal from a vehicle;
one or more fourth transceiver units configured to transmit or receive signals according to a second communication protocol;
a processor communicatively coupled to the one or more first transceiver units and the one or more fourth transceiver units; and
a memory for storing executable instructions, the processor configured to execute the instructions to:
obtain, via the second receiver, the first wakeup signal from the vehicle;
activate the third transceiver in response to obtaining the first wakeup signal;
in response to the activation of the third transceiver, transmit, via the third transceiver, a second wakeup signal to the one or more fourth transceiver units to activate the one or more fourth transceiver units;
receive, via the one or more fourth transceiver units, a challenge signal from the vehicle, wherein the challenge signal is associated with a passive entry or a passive start operation of the vehicle;
based on receipt of the challenge signal, transmit, via the one or more fourth transceiver units, a response to the challenge signal to the vehicle;
receive, via the third transceiver, a success signal from the vehicle based on the response to the challenge signal, wherein the success signal indicates that the portable device is in a predefined proximity of the vehicle; and
deactivate the third transceiver and the one or more fourth transceiver units, on receipt of the success signal.

6. The portable device of claim 5, wherein the second receiver comprises a Bluetooth low energy (BLE) receiver, and the third transceiver comprises a BLE transceiver.

7. The portable device of claim 5, wherein the one or more fourth transceiver units comprise an ultra-wideband (UWB) transceiver.

8. The portable device of claim 5, wherein the first wakeup signal comprises a BLE wakeup signal from the vehicle, and wherein the second wakeup signal comprises a UWB wakeup signal.

9. The portable device of claim 5, wherein the processor is further configured to transmit, via the one or more fourth transceiver units, a UWB awake signal to the vehicle in response to receipt of the second wakeup signal.

10. A Passive Entry Passive Start (PEPS) system comprising:
a vehicle comprising:
a first transceiver unit configured to transmit or receive signals according to a first communication protocol; and
a second transceiver unit configured to transmit or receive signals according to a second communication protocol; and
a portable device communicatively coupled to the vehicle, wherein the portable device comprises:
one or more third transceiver units configured to transmit or receive signals according to the first communication protocol, wherein the one or more third transceiver units comprise a fourth receiver and a fifth transceiver, and wherein the fourth receiver is configured to receive a first wakeup signal from the first transceiver unit of the vehicle;
one or more sixth transceiver units configured to transmit or receive signals according to the second communication protocol;
a processor communicatively coupled to the one or more third transceiver units and the one or more sixth transceiver units; and
a memory for storing executable instructions, the processor configured to execute the instructions to:
obtain, via the fourth receiver, the first wakeup signal from the first transceiver unit of the vehicle;
activate the fifth transceiver in response to obtaining the first wakeup signal;
in response to the activation of the fifth transceiver, transmit, via the fifth transceiver, a second wakeup signal to the one or more sixth transceiver units to activate the one or more sixth transceiver units;
receive, via the one or more sixth transceivers units, a challenge signal from the second transceiver unit of the vehicle, wherein the challenge signal is associated with a passive entry or a passive start operation of the vehicle;
based on receipt of the challenge signal, transmit, via the one or more sixth transceiver units, a response to the challenge signal to the second transceiver unit of the vehicle;
receive, via the fifth transceiver, a success signal from the first transceiver unit of the vehicle, based on the response to the challenge signal, wherein the success signal indicates that the portable device is in a predefined proximity of the vehicle; and
deactivate the fifth transceiver and the one or more sixth transceiver units, on receipt of the success signal.

11. The PEPS system of claim 10, wherein the first transceiver unit comprises a low power BLE transmitter that is configured to transmit low power BLE signal periodically.

12. The PEPS system of claim 10, wherein the second transceiver unit comprises a UWB transceiver.

13. The PEPS system of claim 10, wherein the fourth receiver comprises a BLE receiver and the fifth transceiver comprises a BLE transceiver.

14. The PEPS system of claim 10, wherein the one or more sixth transceiver units comprise a UWB transceiver.

15. The PEPS system of claim 14, wherein the processor is configured to transmit, via the one or more sixth transceiver units, a third wakeup signal to the second transceiver unit of the vehicle, to active the second transceiver unit of the vehicle.

16. A portable device comprising:
one or more first transceiver units configured to transmit or receive signals according to a first communication protocol, wherein the one or more first transceiver units comprise a second receiver and a third transceiver, and wherein the second receiver is configured to receive a wakeup signal from a vehicle;

a fourth receiver configured to receive a signal according to a second communication protocol from the vehicle;

a processor communicatively coupled to the one or more first transceiver units and the fourth receiver; and a memory for storing executable instructions, the processor configured to execute the instructions to:

obtain, via the second receiver, the wakeup signal from the vehicle;

activate the third transceiver in response to obtaining the wakeup signal;

receive, via the third transceiver, a ranging signal from the vehicle;

based on receipt of the ranging signal, transmit, via the third transceiver, a response to the ranging signal to the vehicle;

obtain, via the fourth receiver, the signal according to the second communication protocol from the vehicle when a predefined condition is met;

measure a Received Signal Strength Indicator (RSSI) of the signal;

transmit, via the third transceiver, the measured RSSI to the vehicle to determine a distance between the vehicle and the portable device;

receive, via the third transceiver, a success signal from the vehicle based on the measured RSSI and the response to the ranging signal; and deactivate the third transceiver, on receipt of the success signal.

17. The portable device of claim 16, wherein the second receiver comprises a Bluetooth low energy (BLE) receiver, and the third transceiver comprises a BLE transceiver.

18. The portable device of claim 16, wherein the fourth receiver comprises a low frequency (LF) receiver.

19. The portable device of claim 16, wherein the predefined condition is met when an operator of the vehicle touches a door handle of the vehicle.

20. The portable device of claim 16, wherein the wakeup signal comprises a BLE wakeup signal from the vehicle.

* * * * *